United States Patent
Bazin et al.

(10) Patent No.: US 11,692,100 B2
(45) Date of Patent: Jul. 4, 2023

(54) INTERFERENCE PIGMENT

(71) Applicant: The Swatch Group Research and Development Ltd, Marin (CH)

(72) Inventors: Jean-Luc Bazin, Tuescherz-Alfermee (CH); Csilla Miko, Essertines-sur-Yverdon (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/486,933

(22) PCT Filed: Feb. 26, 2018

(86) PCT No.: PCT/EP2018/054653
§ 371 (c)(1),
(2) Date: Aug. 19, 2019

(87) PCT Pub. No.: WO2018/158188
PCT Pub. Date: Sep. 7, 2018

(65) Prior Publication Data
US 2020/0048470 A1 Feb. 13, 2020

(30) Foreign Application Priority Data

Mar. 2, 2017 (EP) .................. 17158998

(51) Int. Cl.
*C09C 1/00* (2006.01)
*C09C 1/62* (2006.01)

(52) U.S. Cl.
CPC .............. *C09C 1/0015* (2013.01); *C09C 1/62* (2013.01); *C09C 2200/1054* (2013.01);
(Continued)

(58) Field of Classification Search
CPC . C09C 1/0015; C09C 1/62; C09C 2200/1054; C09C 2200/301;
(Continued)

(56) References Cited

U.S. PATENT DOCUMENTS 6,013,370 A 1/2000 Coulter et al.
6,139,613 A * 10/2000 Hendrickson ............. B32B 7/02
106/415

(Continued)

FOREIGN PATENT DOCUMENTS

CN 1651266 A 8/2005
CN 1688659 A 10/2005
(Continued)

OTHER PUBLICATIONS

Shlomo Magdassi, Michael Grouchko, Oleg Berezin, and Alexander Kamyshny ACS Nano 2010 4 (4), 1943-1948 DOI: 10.1021/nn901868t (Year: 2010).*

(Continued)

*Primary Examiner* — Kevin E Yoon
*Assistant Examiner* — Marites A Guino-O Uzzle
(74) *Attorney, Agent, or Firm* — Oblon, McClelland, Maier & Neustadt, L.L.P.

(57) ABSTRACT

A multilayered interference pigment containing, in succession:
a metal core in the form of a flake, the metal core containing a material selected from gold, silver, palladium, rhodium, ruthenium, platinum, osmium, iridium and an alloy thereof;
a first layer of transparent dielectric material; and
a second discontinuous metal layer making it possible to both reflect a portion of the light beam and to transmit another portion of this beam onto the metal core.

12 Claims, 1 Drawing Sheet

(52) U.S. Cl.
CPC .. *C09C 2200/301* (2013.01); *C09C 2200/303* (2013.01); *C09C 2200/307* (2013.01)

(58) Field of Classification Search
CPC ........ C09C 2200/303; C09C 2200/307; C09C 1/00; C09C 1/642; C09C 2210/00; C09C 2200/00; C09C 2220/10; C09C 2200/50; C09C 3/06; C09K 11/00; C09K 11/02; C09D 5/36; C09D 5/00
See application file for complete search history.

(56) References Cited

U.S. PATENT DOCUMENTS

| | | | |
|---|---|---|---|
| 6,565,770 | B1 | 5/2003 | Mayer et al. |
| 6,572,784 | B1 | 6/2003 | Coombs et al. |
| 2004/0166316 | A1* | 8/2004 | Noguchi ............... C09C 1/0021 428/402 |
| 2008/0318012 | A1* | 12/2008 | Domnick ............. C09C 1/0015 428/216 |
| 2015/0138641 | A1 | 5/2015 | Delst et al. |
| 2019/0211211 | A1 | 7/2019 | Fujita et al. |

FOREIGN PATENT DOCUMENTS

| | | |
|---|---|---|
| CN | 1926200 A | 3/2007 |
| CN | 101384674 A | 3/2009 |
| CN | 101517011 A | 8/2009 |
| CN | 103025832 A | 4/2013 |
| CN | 104656175 A | 5/2015 |
| CN | 105295448 A | 2/2016 |
| CN | 106459613 A | 2/2017 |
| JP | 2-124981 A | 5/1990 |
| JP | 2003-113330 A | 4/2003 |
| JP | 2003-515651 A | 5/2003 |
| JP | 2006-258648 | 9/2006 |
| JP | 2009-511725 A | 3/2009 |
| WO | WO 99/35194 A1 | 7/1999 |
| WO | WO 02/40599 A1 | 5/2002 |
| WO | WO 02/40600 A1 | 5/2002 |
| WO | WO 2016/097419 A1 | 6/2016 |
| WO | WO 2018/034261 A1 | 2/2018 |

OTHER PUBLICATIONS

Combined Chinese Office Action and Search Report dated Aug. 20, 2020 in Chinese Patent Application No. 201880014229.7 (with English translation), 18 pages.
International Search Report dated Apr. 26, 2018 in PCT/EP2018/054653 filed Feb. 26, 2018.
Korean Office Action dated Jan. 26, 2021 in Korean Patent Application No. 10-2019-7024662 (with English translation), 15 pages.
Combined Chinese Office Action and Search Report dated Feb. 19, 2021 in Patent Application No. 201880014229.7 (with English language translation and English translation of Category of Cited Documents), 13 pages.
Ofice Action dated Jul. 13, 2021 in Japanese Patent Application No. 2019-546183, (with English Translation).

* cited by examiner

INTERFERENCE PIGMENT

TECHNICAL FIELD

The present invention relates to a new interference pigment with a specific application in the fields of horology, jewelry and cosmetics.

TECHNICAL BACKGROUND

The creation of a palette of colours from the interference of reflected light on multilayered structures is well known. Reference can be made to documents EP 0 905 205 and U.S. Pat. No. 6,626,989 which disclose pearlescent pigments comprising a mica core coated with a layer of titanium oxide.

More recently, interference pigments with a metal core have become more popular. The choice of core metal is mainly limited to aluminium. Although this type of pigment already has an attractive aesthetic appearance, the intensity and brilliance of interference colours can be improved further by playing with optical properties of the core metal.

SUMMARY OF THE INVENTION

The present invention thus proposes a new interference pigment which makes it possible to improve the aesthetic appearance of the article comprising it.

For this purpose, a pigment, its use and an article are proposed according to the attached claims.

More precisely, the present invention proposes a multilayered interference pigment comprising in succession:
- a metal core in the form of a flake, the metal core comprising a material selected from gold, silver, palladium, rhodium, ruthenium, platinum, osmium, iridium and an alloy thereof;
- a first layer of transparent dielectric material;
- a second discontinuous metal layer.

By means of this metal core, which is made from a precious metal and has increased reflectivity that is preferably greater than that of aluminium in at least one part of the visible spectrum, the interference colours increase in brilliance and intensity compared to those obtained with a conventional interference pigment. This results in coated or solid articles with a particular sparkle which is highly appreciated in the field of horology, jewelry and cosmetics.

According to particular embodiments of the invention, the interference pigment has one or a suitable combination of the following features:
- the metal core is made from a material selected from gold, silver, rhodium and an alloy thereof and is more preferably selected from gold, silver and an alloy thereof;
- it comprises a third protective layer formed by a transparent dielectric material or a transparent resin;
- the dielectric material of the first layer and the third layer is selected from $TiO_2$, $SiO_2$, $Al_2O_3$, $MgF_2$, AlN, $Ta_2O_5$, $Si_3N_4$ZnS, ZnO, $ZrO_2$, $Cr_2O_3$, $CeO_2$, $Y_2O_3$, HfN, HfC, $HfO_2$, $La_2O_3$, MgO, $Sb_2O_3$, SiO, $Se_2O_3$, $SnO_2$ and $WO_3$;
- the second metal layer is made from a material selected from silver, gold, aluminium, titanium, palladium, platinum, ruthenium, osmium, iridium, tin, chromium, iron, cobalt, nickel, copper, zinc, rhodium and an alloy thereof;
- the metal core has an average transverse diameter between 2 and 300 µm, preferably between 5 and 100 µm and more preferably between 10 and 30 µm, and an average thickness between 20 and 1000 nm and, preferably, between 300 and 500 nm;
- the first layer has a thickness between 50 and 500 nm and, preferably, between 300 and 400 nm;
- the second layer and the third layer have a thickness between 1 and 30 nm and, preferably, between 1 and 10 nm;
- the second layer is in the form of particles arranged at intervals.

The present invention also relates to an article and in particular to a trim piece for horology or jewelry comprising interference pigments as described above.

According to particular embodiments of the invention, the article has a coating comprising interference pigments or has interference pigments within its mass.

The present invention also relates to a watch or piece of jewelry comprising the article with interference pigments.

It also relates to the use of interference pigments described above in formulations of paint, ink or cosmetics.

BRIEF DESCRIPTION OF THE FIGURES

The invention is described in the following in a more detailed manner with reference to the attached drawings, given by way of example but without restriction, in which.

DETAILED DESCRIPTION OF THE INVENTION

The present invention relates to a multilayered interference pigment comprising a core made from a pure or alloyed precious metal, such as gold, silver, platinum, palladium, ruthenium, rhodium, osmium or iridium. These metals have a degree of reflectivity that is greater than 70%, even greater than 80% or even 90% in all or part of the visible spectrum (380 nm-780 nm). The metals selected are preferably rhodium, gold, silver or an alloy thereof and, more preferably, gold, silver or an alloy thereof. Gold has an increased reflectivity for wavelengths greater than 550 nm. It is therefore preferred when warm colours (reds, yellows) are required. However, silver has increased reflectivity over a more extended range of the visible spectrum which also makes it possible to obtain blue and green colours. In the case of an alloy, the choice relates to an Ag—Pt alloy for example.

Figure 1:
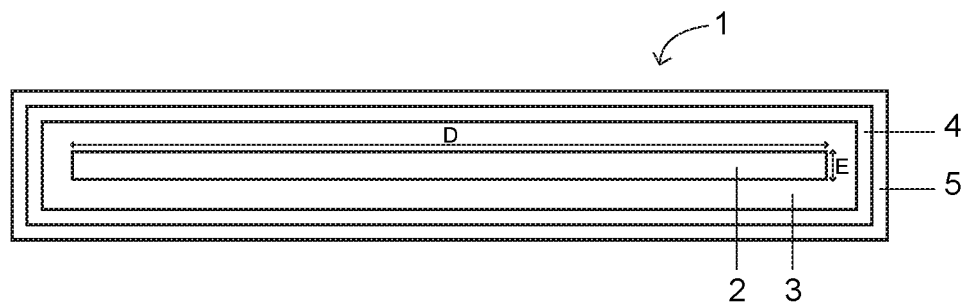
FIG. 1 represents schematically the different layers of the interference pigment according to the invention.

The pigment 1 according to the invention represented in FIG. 1 comprises the metal core 2 coated with a first layer 3 of dielectric material which forms the interference medium, which is covered itself by a second layer 4 of metal material and possibly coated by a third protective layer 5.

The metal core 2 is in the form of an elongated flake with an average transverse diameter D between 2 and 300 µm, preferably between 5 and 100 µm and more preferably between 10 and 30 µm. It has an average thickness E between 20 and 1000 nm and preferably between 300 and 500 nm. In general, the form factor of the flakes, i.e. the ratio of the average transverse diameter to the average thickness is between 5 and 1000 and preferably between 10 and 500.

The first layer 3 comprises a transparent dielectric material which for example can consist of $TiO_2$, $SiO_2$, $Al_2O_3$, $MgF_2$, AlN, $Ta_2O_5$, $Si_3N_4$, ZnS, ZnO, $ZrO_2$, $Cr_2O_3$, $CeO_2$, $Y_2O_3$, HfN, HfC, $HfO_2$, $La_2O_3$, MgO, $Sb_2O_3$, SiO, $Se_2O_3$, $SnO_2$, or $WO_3$, with a preference for $SiO_2$. This layer has a thickness between 50 and 500 nm and, preferably, between 300 and 400 nm, the thickness and the refractive index of the dielectric material being selected as a function of the desired interference colour.

The second layer 4 is formed by a metal or a metal alloy designed to reflect light on the surface of the interference pigment. The metal is preferably selected from silver, gold, aluminium, titanium, palladium, platinum, ruthenium, rhodium, osmium, iridium, tin, chromium, iron, cobalt, nickel, copper, zinc, rhodium and an alloy thereof. It is more preferably selected from silver, gold, aluminium, rhodium and an alloy thereof. This layer has a thickness between 1 and 30 nm and, preferably, between 1 and 10 nm. The layer is configured to enable the transmission of a portion of the light beam incident to the metal core. It is thus preferably discontinuous, non-uniform and possibly formed by particles. In the latter case, the particles are preferably arranged at intervals with a spacing between the particles in the order of several nanometers. Of course, such a second discontinuous metal layer makes it possible both to reflect a portion of the light beam and transmit another portion of this beam onto the metal core.

The third protective layer 5, which is optional, is designed to protect the second metal layer from oxidation or wear. This layer is preferably made from a transparent dielectric material such as $TiO_2$, $SiO_2$, $Al_2O_3$, $MgF_2$, AlN, $Ta_2O_5$, du $Si_3N_4$, ZnS, ZnO, $ZrO_2$, $Cr_2O_3$, $CeO_2$, $Y_2O_3$, HfN, HfC, $HfO_2$, $La_2O_3$, MgO, $Sb_2O_3$, SiO, $Se_2O_3$, $SnO_2$, $WO_3$ or a transparent resin. This layer has a thickness between 1 and 30 nm and preferably between 1 and 10 nm.

The present invention does not exclude the insertion of intermediate layers between the metal core and the first layer and/or between the first and second layers in order to increase the adhesion between the different constituent layers of the interference pigment.

Figure 2:
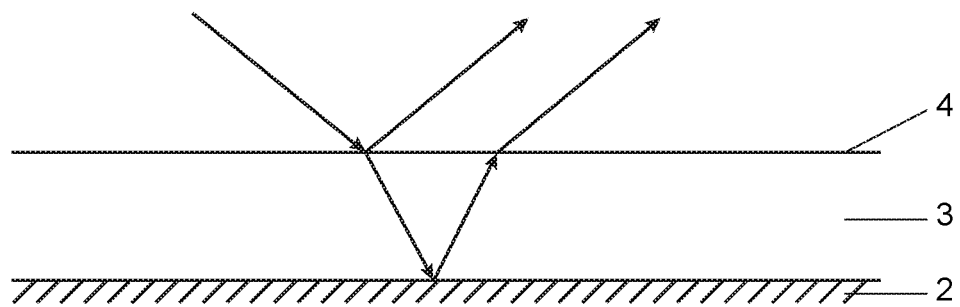
FIG. 2 represents schematically the optical paths of light through the interference pigment according to the invention.

As illustrated in FIG. 2, a portion of the incidental light is reflected on the outer metal layer 4 whilst another portion is transmitted and reflected on the metal core 2. The difference in the trajectory of the reflected beams creates a colour due to the effect of interference which has nuances depending on the angle of observation.

According to the invention, the metal core can be made from a leaf, for example gold or silver leaf, with outer layers deposited by CVD, PVD, electrochemically or by a non-electrolytic process, the whole being subsequently crushed. The multilayered pigment can also be made from flakes obtained chemically by wet or dry methods, or even by atomisation, possibly crushed before being coated.

The pigment powder obtained in this way can be dispersed in an appropriate medium according to the application. It can thus be used in formulations for paint, ink, cosmetic products and as well as generally in coating formulations.

It is also possible to use the pigment powder as it is. In this configuration, the previously deposited powder is compacted onto a substrate then sintered in a uniform or selective manner from the effect of a local application of heat for example by laser. This results in a dense coating covering all or part of the substrate. It is also possible to form solid articles by compacting and thickening the pigment powder. It is also possible to produce solid particles by means of additive manufacturing.

By way of example, in the field of horology, the pigments can be used after dispersion in an appropriate medium or as such for coating or decorating a trim piece (dial, bezel, caseband, base, clasp, . . . ) or for forming a solid trim piece (dial, hand, pointer, pushbutton, etc.).

Finally, it should be noted that the pigment with a core made of pure gold and its different layers is titratable at 18 carats. Thus for a pigment comprising in succession:
 a gold core with a thickness of 400 nm for a transverse diameter of 30 μm,
 a first coating layer of $SiO_2$ with a thickness of 330 nm,
 a second metal coating layer of Ag with a thickness of 5 nm,
 a third protective layer of $SiO_2$ with a thickness of 10 nm,
the percentage by weight of gold is 79.01%, i.e. greater than the 75% required for 18 carat gold.

The metal core can also be made from other precious alloys in order to achieve legal standards such as for example Pd500 or Pt900.

KEY TO THE FIGURES (1) interference pigment
(2) metal core
(3) first layer, also referred to as dielectric layer
(4) second layer, also referred to as metal layer
(5) third layer, also referred to as protective layer
D: Transverse diameter of the metal core forming a flake
E: Thickness of metal core forming a flake

The invention claimed is:

1. A sintered multilayered interference pigment comprising in succession:
 a metal core comprising a material selected from the group consisting of gold, silver, palladium, rhodium, ruthenium, platinum, osmium, iridium, and alloys thereof;
 a first layer of transparent dielectric material; and
 a second discontinuous metal layer making it possible to both reflect a portion of a light beam and to transmit another portion of this beam onto the metal core,
 wherein the metal core is in the form of an elongated flake having an average transverse diameter D between 2 and 300 μm, an average thickness E between 20 and 1000 nm, and a form factor defined as the ratio of the average transverse diameter to the average thickness of between 5 and 1000 .

2. The pigment according to claim 1, wherein the metal core comprises a material selected from the group consisting of gold, silver, rhodium, and alloys thereof.

3. The pigment according to claim 1, further comprising a third protective layer comprising a transparent dielectric material or a transparent resin.

4. The pigment according to claim 3, wherein the dielectric material of the first layer and of the third protective layer is selected from the group consisting of $TiO_2$, $SiO_2$, $Al_2O_3$, $MgF_2$, AlN, $Ta_2O_5$, $Si_3N_4$ ZnS, ZnO, $ZrO_2$, $Cr_2O_3$, $CeO_2$, $Y_2O_3$, HfN, HfC, $HfO_2$, $La_2O_3$, MgO, $Sb_2O_3$, SiO, $Se_2O_3$, $SnO_2$, and $WO_3$.

5. The pigment according to claim 1, wherein the second discontinuous metal layer comprises a material selected from the group consisting of silver, gold, aluminium, titanium, palladium, platinum, ruthenium, rhodium, osmium, iridium, tin, chromium, iron, cobalt, nickel, copper, zinc, rhodium, and alloys thereof.

6. The pigment according to claim 1, wherein the metal core has an average transverse diameter between 5 and 100 μm, and. a form factor defined as the ratio of the average transverse diameter to the average thickness of between 10 and 500.

7. The pigment according to claim 1, wherein the first layer has a thickness between 50 and 500 nm.

8. The pigment according to claim 3, wherein each of the second discontinuous metal layer and the third protective layer have a thickness between 1 and 30 nm.

9. The pigment according to claim 3, wherein the second discontinuous metal layer is in the form of particles arranged at intervals.

10. An article, comprising interference pigments according to claim 1.

11. The article according to claim 10, comprising a coating comprising interference pigments.

12. The article according to claim 10, comprising interference pigments in the mass.

* * * * *